United States Patent [19]
Codos

[11] Patent Number: 5,868,383
[45] Date of Patent: Feb. 9, 1999

[54] MULTIPLE RATE COIL SPRING ASSEMBLY

[75] Inventor: Richard N. Codos, Warren, N.J.

[73] Assignee: L&P Property Management Company, South Gate, Calif.

[21] Appl. No.: 827,198

[22] Filed: Mar. 27, 1997

[51] Int. Cl.$^6$ .............................. F16F 3/10; B65B 9/00; B65B 63/00
[52] U.S. Cl. .............................. 267/80; 5/655.8; 5/720; 53/114; 53/450; 29/91.1; 367/166.1; 367/91
[58] Field of Search .................... 267/80, 81, 91–101, 267/288, 166, 166.1, 168, 180, 142, 144, 33, 152, 153; 5/720, 655.8, 248, 256; 29/91.1, 91; 53/114, 550, 450, 526, 127, 438; 156/70; 140/3 CA, 92.4

[56] References Cited

U.S. PATENT DOCUMENTS

| | | | |
|---|---|---|---|
| 182,924 | 10/1876 | Hansell | 267/288 |
| 333,983 | 1/1886 | Vose | 267/288 |
| 394,007 | 12/1888 | Pfeil | 267/166.1 |
| 1,466,617 | 8/1923 | Foster . | |
| 2,359,003 | 9/1944 | Sawyer . | |
| 2,430,098 | 11/1947 | Rinch . | |
| 2,616,684 | 11/1952 | Richter | 267/166.1 |
| 3,462,779 | 8/1969 | Thompson . | |
| 3,751,025 | 8/1973 | Beery et al. | 267/166.1 |
| 4,120,489 | 10/1978 | Borlinghaus | 267/166.1 |
| 4,234,983 | 11/1980 | Stumpf . | |
| 4,401,501 | 8/1983 | Stumpf . | |
| 4,439,977 | 4/1984 | Stumpf . | |
| 4,451,946 | 6/1984 | Stumpf . | |
| 4,485,506 | 12/1984 | Stumpf et al. . | |
| 4,566,926 | 1/1986 | Stumpf . | |
| 4,578,834 | 4/1986 | Stumpf . | |
| 4,679,266 | 7/1987 | Kraft . | |
| 4,854,023 | 8/1989 | Stumpf . | |
| 4,867,423 | 9/1989 | Marsh . | |
| 4,918,773 | 4/1990 | Scott . | |
| 4,972,536 | 11/1990 | Scott . | |
| 4,986,518 | 1/1991 | Stumpf . | |
| 5,054,178 | 10/1991 | Zuger | 29/91.1 |
| 5,099,757 | 3/1992 | Jennings | 267/168 |
| 5,105,488 | 4/1992 | Hutchinson et al. . | |
| 5,126,004 | 6/1992 | Suenens et al. . | |
| 5,136,740 | 8/1992 | Kraft . | |
| 5,325,553 | 7/1994 | Ripley et al. . | |
| 5,507,476 | 4/1996 | Lin | 267/166.1 |
| 5,572,853 | 11/1996 | Clair et al. | 53/114 |

FOREIGN PATENT DOCUMENTS

WO 94/18116 8/1994 WIPO .

*Primary Examiner*—Douglas C. Butler
*Attorney, Agent, or Firm*—Wood, Herron & Evans, LLP

[57] ABSTRACT

An automated method for the manufacture of a coil spring assembly including inserting coil springs having predetermined multiple spring rates into respective individual pockets of a continuous pocket strip in a predetermined order. The predetermined multiple spring rates of at least one coil spring may differ from that of the other coil springs, and each of the multi-rate coils has at least two different spring rates. One or more wires having a substantially uniform thickness are coiled to form the multiple rate coil springs before insertion into the continuous pocket strip. The wire is preferably coiled to produce a coil spring having at least two different diameters and at least two different pitches. The method also includes cutting the spring-filled strip into one or more desired lengths, placing at least two spring-filled lengths adjacent to each other; and attaching adjacent lengths together. A coil spring assembly may thus be provided with one or more firmness zones. Perimeter coil springs may also be inserted into pockets corresponding to the outer perimeter of the coil spring assembly, and border wire may be added for stiffness.

48 Claims, 8 Drawing Sheets

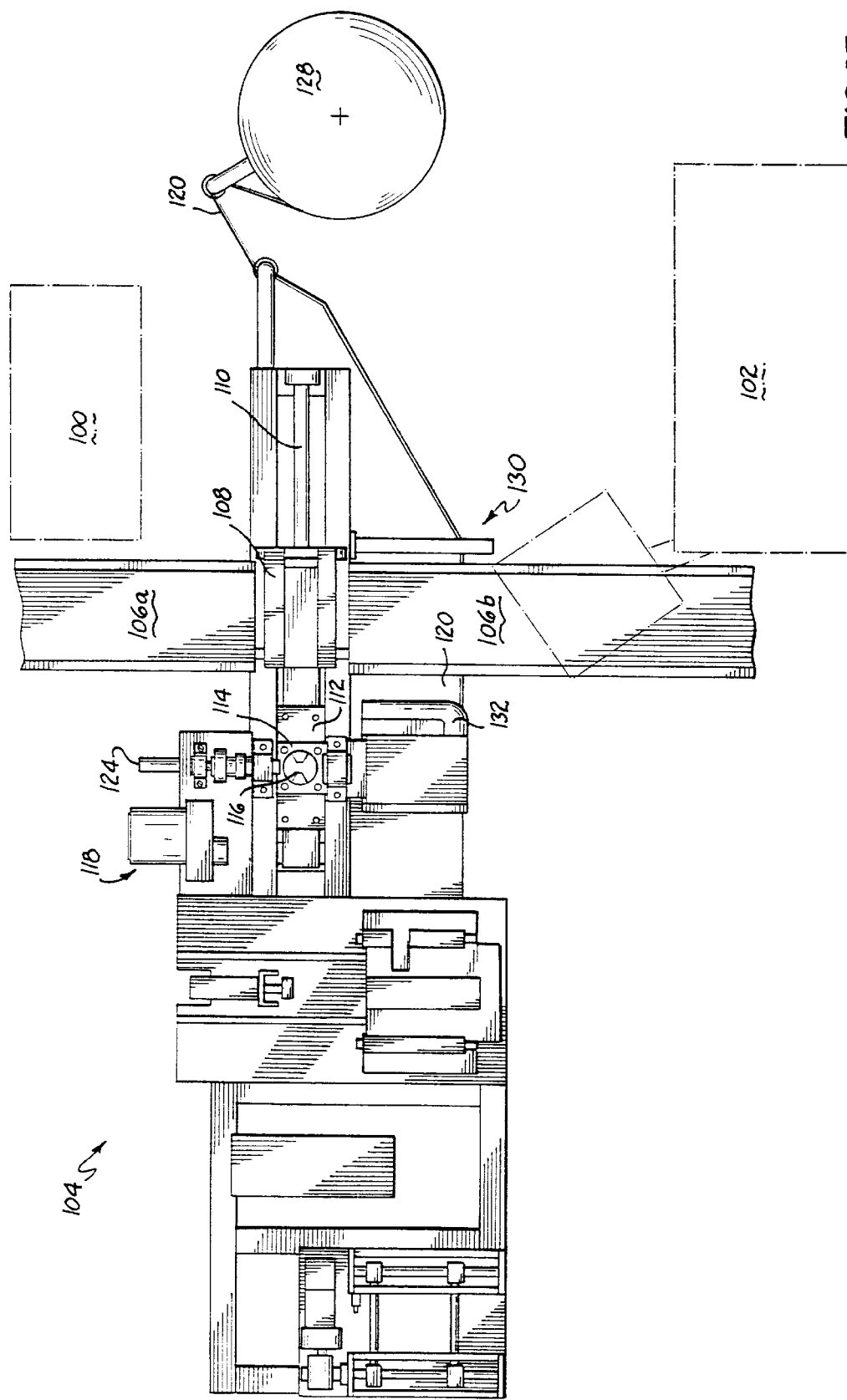

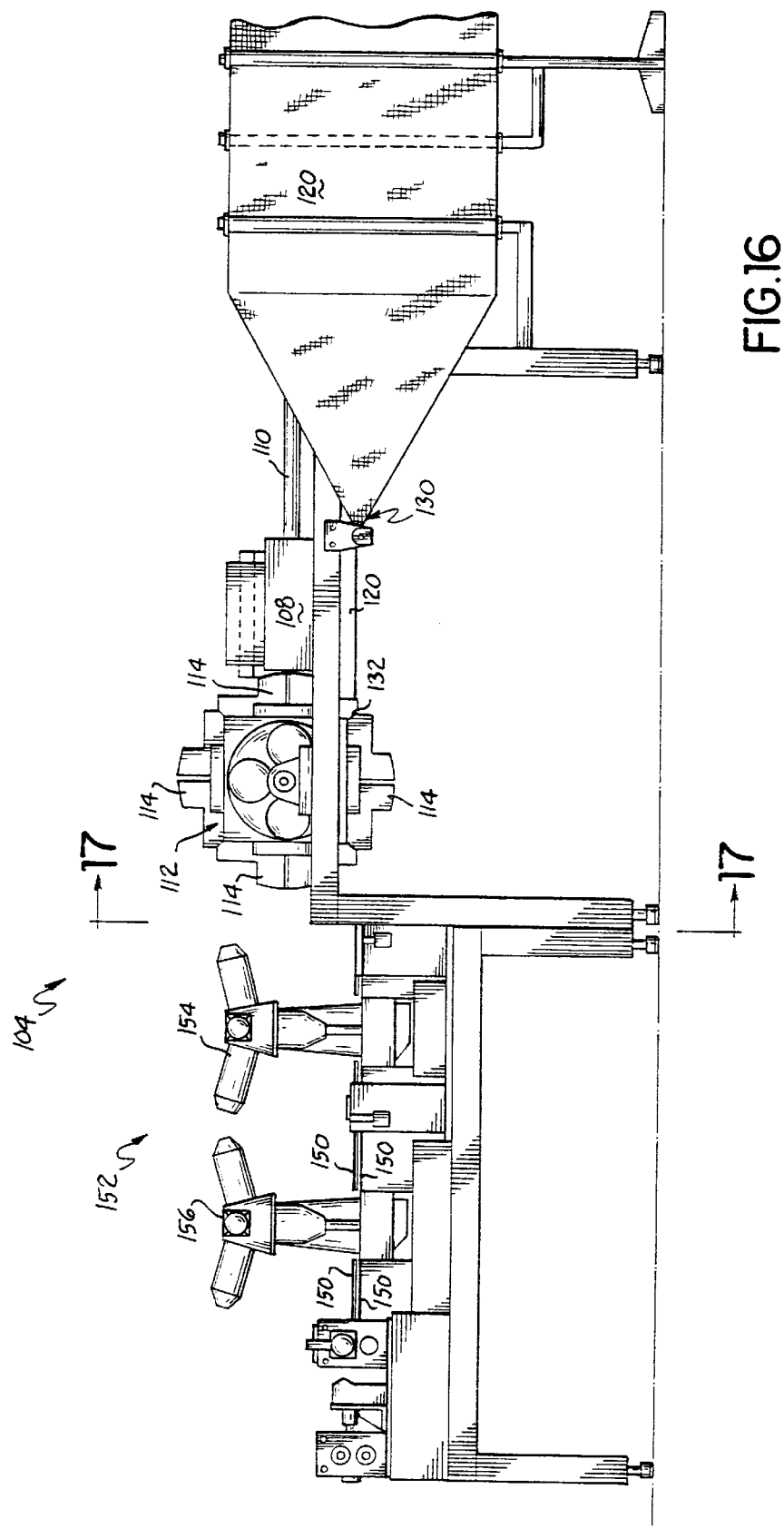

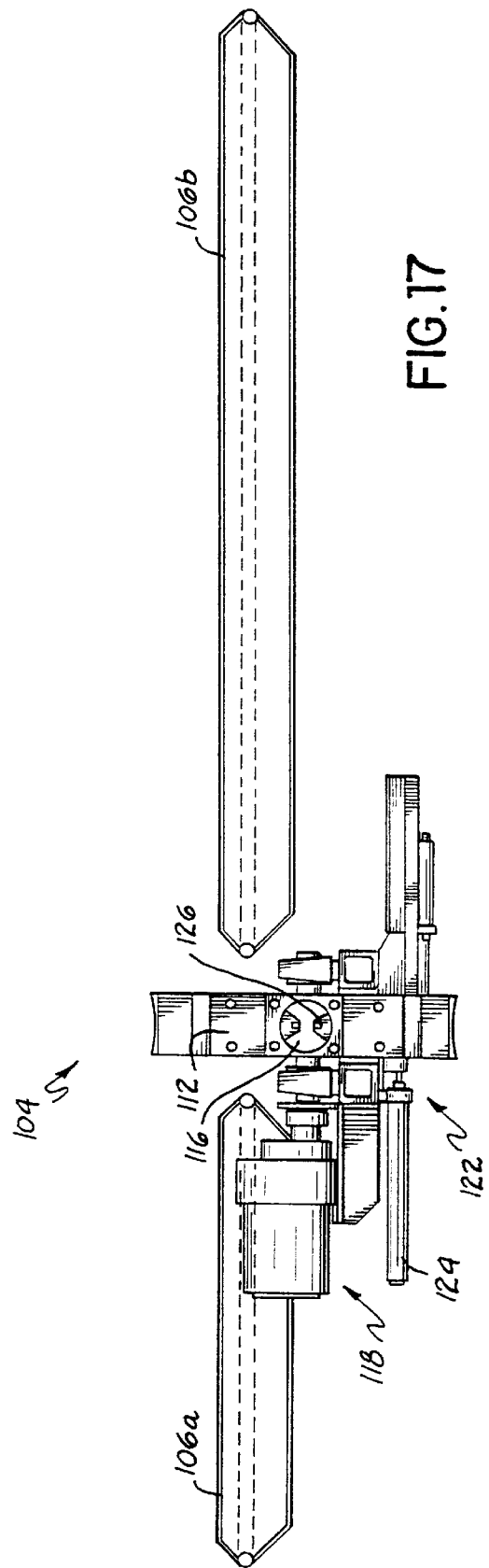

MULTIPLE RATE COIL SPRING ASSEMBLY

BACKGROUND OF THE INVENTION

The present invention relates to coil spring assemblies and mattresses generally and, more particularly, but not by way of limitation, to a novel multiple rate coil spring assembly.

DESCRIPTION OF THE RELATED ART

Pocketed coil spring assemblies may be assembled by inserting coil springs into respective pockets of a continuous pocket coil strip, sealing each coil spring in its pocket, cutting a section of the strip to a length which corresponds to a width or a length of the desired assembly, and attaching the cut lengths together to form the final assembly.

Most mattresses or innersprings utilizing a pocketed coil construction typically contain coil springs having uniform spring rates, and all the coil springs generally have identical compression features. Thus, in an automated production run, coil springs having identical uniform spring rates are inserted into a continuous pocket coil strip, wherein a number of coil spring assemblies are assembled from a single pocket coil strip, and wherein cut lengths of spring-filled pockets correspond to consecutive rows of consecutive coil assemblies.

Other mattress units include one or more levels of foam and/or polyester layers which are disposed over a pocket coil matrix. However, foam and polyester are typically less responsive than springs to a change in user position, and further become lumpy and uncomfortable. Moreover, foam, polyester and the like usually deteriorate substantially over time, and eventually assume a contorted body imprint corresponding to the most frequent positions taken by the user. A user is then compelled to turn or rotate the mattress in an attempt to even out or avoid the imprints.

The desirability of providing a coil spring assembly with different firmness zones or sections has been recognized in the art. For example, it may be desirable for the center section of a mattress to support a greater load than the head and foot sections, so that a center zone providing a relatively firmer support area to bear the majority of the weight of the user would be desirable.

Known methods of assembling a variable firmness mattress relies on construction on a zone by zone basis for a single horizontal layer, or on a layer by layer basis, for example for a horizontal layer mattress. Each pocket of a single coil strip is filled with a respective coil spring, and each coil spring has a uniform spring rate equal to the spring rate of the other springs in that particular strip. Another known continuous pocket strip is similarly filled with a row of coil springs of uniform spring rate, but with a different spring rate than that of the springs in another row. The different spring rate is achieved by utilizing coil springs of different construction or with a different thickness or gauge.

Another known method for producing a variable firmness mattress includes inserting coil springs having uniform spring rates into first and second pocket coil strips in which the spacing between pockets differs for each of the strips. The assembly of differently spaced coil strips into various zones produces a mattress having more than one overall firmness zone.

U.S. Pat. No. 4,679,266 issued to Kraft discloses a varying firmness mattress having four longitudinally arranged regions for supporting a person with rows of coil springs. Changes in firmness are provided by varying the wire gauge of the springs in the different sections or by varying the barrel or diameter of the springs, although each zone is composed of a subassembly having uniform size and shape springs. The stiffness of the springs can also be adjusted by using more or less resilient wire, or using differing barrel or hourglass sizes. Furthermore, the firmness of the mattress can also be varied by varying the density of the support, such as using more or less springs or denser or less dense foam material. Nevertheless, the firmness of the springs in each of the four regions is constant and is uniform from side to side at any particular location of the mattress, although the outer edges may be provided for a stiffer gauge wire.

U.S. Pat. Nos. 4,972,536 and 4,918,773 issued to Scott disclose a mattress having springs of different firmness provided either by the use of wire having different characteristics, or by coil springs of different heights. Assembly of the mattress is accomplished by providing individual bands of springs uncoiled from rolls of interlaced coil springs, as opposed to direct feeding of the stock through an assembly machine from a coil forming machine. Bands of firmer springs are provided at the ends of the mattress. The patents also provide an alternative to the center and end portions having springs of differing gauge or diameter by providing same diameter springs but differing tensile strength or relaxed height of the individual coils. However, coil firmness are uniform within a band of coil springs.

U.S. Pat. No. 4,986,518 issued to Stumpf discloses a continuous strip of pocketed coil springs which may be adapted to accommodate springs having various shapes and sizes, but does not provide a means for placing adjacent springs having differing spring rates in a coil strip.

U.S. Pat. No. 5,325,553 issued to Ripley et al. discloses a mattress spring with a reinforcing frame in the lumbar area which encircles coil springs. The coil springs all have the same diameter. The patent also discloses varying the total number of springs, spring size, compression, and coiled spring alignment. Furthermore, the number of transverse rows of coiled springs can be varied depending on spring size. However, this patent does not disclose varying these factors on an individual spring basis.

U.S. Pat. No. 5,136,740 issued to Kraft discloses a varying firmness mattress having four different rubber-like foam densities and firmnesses which may be joined together edge to edge with a suitable adhesive. The foam pad is provided with numerous depressions or indentations, and the firmness varies with the depths, widths and shapes of the indentations. Each region is of a uniform firmness, but adjacent sections may have a differing firmness. Furthermore, this patent provides a mattress as also being made of a conventional coil spring construction wherein the coil springs may vary in diameter, height or configuration, e.g., the coil springs may have the shape of a cylinder, barrel, hourglass, or the like. However, variations are limited to those between zones.

U.S. Pat. No. 5,105,488 issued to Hutchinson discloses a bedding configuration having variable support characteristics, wherein various air chambers, cylinders, and tubes provide support in the lumbar portion of the mattress which may be selectively inflated or deflated in order to provide corresponding firmness levels. Furthermore, the patent discloses the use of such air chambers with pocketed coils, and in particular, half-size pocketed coils which may be placed adjacent the air chamber. Moreover, inflatable tubes may be positioned in the gaps formed by the top and bottom portions of barrel-shaped pocket coils.

As discussed above, prior methods of producing such a mattress may involve producing two or more runs of two or more continuous spring filled coil strips wherein each strip has uniform coil springs of substantially the same characteristics, although different coil strips may have different type springs, then cutting the strips and assembling the cut lengths in desired combinations. Furthermore, prior methods do not provide for the insertion of various coil springs having different characteristics in a single continuous pocket strip or a section thereof, whether each individual spring has a uniform or variable spring rate, into the strip on a pocket by pocket basis. Moreover, none of the prior methods facilitates automated customization of a mattress which is selectable on a pocket by pocket basis.

Therefore, there is a need for providing a mattress or coil spring assembly which offers multiple spring rate support, and which can be economically fabricated on an automated basis. According to the present invention, great flexibility in providing such a mattress can be achieved by inserting coil springs, which preferably include coils springs having multiple spring rates, into respective individual pockets of a pocket coil strip, wherein the spring rate characteristics of each coil spring may be selectively the same as, or different from, any other coil spring in the same assembly.

In the past, pocketed coil or continuous coil innersprings having individual coil springs with differing compression features within a single pocketed coil row could not be economically manufactured on a production basis.

One object of the invention is to provide a new and novel means for creating a pocketed coil spring assembly or innerspring mattress unit wherein one or more coil springs have a spring rate differing from other coil springs in the unit, and wherein each coil is automatically placed in a desired pocket. At least one of the coil springs preferably has a multiple spring rate. Another object is to provide a method of manufacturing or assembling the pocketed coil spring assembly which can be both automated and continuous, at least on a batch basis. Thus, the pocketed coil spring assembly preferably includes multiple spring rate coils wherein each coil spring has been individually coiled so as to have multiple spring rates, and wherein each coil spring is inserted into a predetermined pocket of a continuous pocket strip.

It is another object of the invention to provide a means for manufacturing a mattress with different firmness levels or zones which is not laborious and difficult to implement.

It is yet another object of the invention to provide mattresses with a customizable arrangement of multiple rate coil springs within a pocket coil framework.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a particular embodiment, an automated method for the manufacture of a coil spring assembly comprising inserting coil springs, preferably having predetermined multiple spring rates into respective individual pockets of a continuous pocket strip in a predetermined order. One or more coil springs may have spring rates which differ from one or more other coil springs. The predetermined multiple spring rates of at least one coil spring may differ from that of the other coil springs, and each of the coils may have at least two different spring rates.

The automated method may further include the step of sealing each coil spring inside its respective pocket. The method may also include coiling one or more wires having a substantially uniform thickness into the coil springs before insertion into the continuous pocket strip.

The method may further comprise cutting the spring-filled strip into one or more desired sections or lengths, placing at least two spring-filled sections adjacent to each other, and attaching adjacent sections together. The adjacent strips may be joined by hot melt adhesive or by glue.

The individual pockets in the coil strip may be uniformly spaced. Moreover, the pockets in each length of the coil strip may be uniformly spaced by a first distance, and the adjacent sections or lengths may be uniformly spaced apart by a second distance.

The spring filled pocket coil strip may be rolled into one or more rolls. The attached adjacent sections may be also rolled into one or more rolls. The spring filled pocket coil strip or attached adjacent sections may be compressed in either the rolled or unrolled states. The attached adjacent lengths may also be simultaneously compressed and rolled.

The wire may be coiled to produce a coil having at least two different diameters, at least two different pitches, or at least two different diameters and at least two different pitches.

The multiple spring rate coil springs may be inserted into the pocket strip in a predetermined order to form at least two firmness zones upon attaching adjacent lengths or sections together. The firmness zones may comprise a head zone, a foot zone, and a middle zone.

Furthermore, the automated method may comprise inserting a plurality of perimeter coil springs in respective perimeter pockets corresponding to the outer perimeter of the coil spring assembly. The perimeter coil springs may be formed by coiling a wire, such as a wire having a second substantially uniform thickness before insertion into the continuous pocket strip, wherein the second thickness differs from the thickness of the other coil springs. The perimeter coil springs may also be preformed and supplied by hopper, or the thicker gauge wire may be coiled into multiple rate perimeter coil springs before insertion into the continuous pocket strip.

The automated method may further comprise installing one or more border wires around the outer perimeter of the coil spring assembly.

In another embodiment, the present invention concerns an automated method of manufacturing a coil spring assembly from a continuous pocket coil strip having a plurality of open pockets disposed along a longitudinal axis, wherein each pocket has a central axis which is substantially orthogonal to the longitudinal axis of the coil strip, and from a plurality of coil springs, each coil spring have a plurality of coils, and wherein at least one coil spring has a different spring characteristic than at least one other coil spring and wherein each spring has an axis of compression, wherein the method includes inserting each spring into a respective open pocket of the continuous pocket coil in a predetermined order, and then closing the pockets. The automated method may also include detaching, at respective predetermined lengths, at least two sections of the continuous pocket coil strip containing the springs. The method may also include aligning the axis of compression of each spring perpendicularly to the central axis of a respective pocket before insertion therein.

The automated method may further include rotating each spring within its respective pocket, thereby aligning the axis of compression of each spring with the axis of its respective pocket. The automated method may further include attaching at least two sections in side-by-side relationship, wherein the longitudinal axes of the sections are substantially parallel to each other and the axes of compression of the coil springs are parallel to each other. The sections may be cut into equal lengths, or into various lengths.

Attached portions of pocket coil may form a pocket coil assembly having at least two zones of coil springs, wherein the coil springs in each zone have substantially similar spring rate characteristics, and wherein the spring rate characteristics of at least two of the zones differ. At least one of the coil springs may have at least two spring rates. The method may further involve at least one coil spring which has a first end portion having a first pitch, a second end portion having substantially similar or equal pitch and a middle having a second pitch and integrally disposed between the first and second end portions. The second pitch may be greater than the first pitch. Furthermore, at least one coil of at least one of the end portions of at least one of the coil springs may decrease in diameter in an endward direction.

In practicing the method of the present invention, a particular embodiment of a coil spring assembly may be manufactured wherein the coil spring assembly comprises a plurality of multiple spring rate coil springs, each spring having at least two spring rates, and a connective matrix means for maintaining the coil springs in a spaced apart relationship and for allowing the coil springs to compress and expand. Each multiple spring rate coil spring further preferably comprises a plurality of coils of substantially uniform thickness. At least one of the multiple rate springs has at least two coils of different diameters or different pitches, or at least one of the multiple rate springs has at least two coils having different diameters and pitches.

A firmness zone may be formed where at least two adjacent coil springs have substantially similar spring rates. At least one multiple firmness zone may be formed where at least two adjacent multiple rate springs have substantially similar multiple spring rates.

The coil spring assembly may further comprise a plurality of perimeter springs generally disposed at the outer perimeter of the mattress. wherein each of the perimeter springs preferably includes a plurality of coils of substantially uniform thickness which is greater than the thickness of the coils of the multiple rate springs. For example, for a connective matrix means which includes a plurality of pockets, a plurality of perimeter springs may be inserted into respective pockets corresponding to the outer perimeter of the mattress.

In practicing the method of the present invention, a particular embodiment of a mattress of pocket coil construction may be manufactured or assembled, the mattress comprising a plurality of pockets and a plurality of multiple spring rate coil springs, each spring having at least two spring rates. Each spring further preferably comprises a plurality of coils of substantially uniform thickness, and the springs are disposed in respective selected pockets. The plurality of springs preferably has a substantially uniform height. At least one of the multiple rate springs has at least two coils of different diameters or pitches, or at least one of the multiple rate springs has at least two coils having different diameters and pitches. At least one multiple firmness zone can be created wherein at least two adjacent multiple rate springs have substantially similar multiple spring rates. The mattress may further comprise at least two multiple firmness zones, wherein the multiple spring rates of at least two zones differ.

A particular embodiment of the mattress may contain multiple rate springs which are substantially uniformly spaced. Thus, the multiple rate springs may be substantially uniformly spaced in a first direction, and the multiple rate springs may also be substantially uniformly spaced in a second direction which is substantially perpendicular to the first direction. The uniform spacing in the first and second directions may be the same or may differ.

The mattress may further comprise a plurality of perimeter springs disposed in respective perimeter pockets corresponding to the outer perimeter of the mattress, wherein each of the perimeter springs includes a plurality of coils of substantially uniform thickness, the thickness being greater than the thickness of the coils of the multiple rate springs. The perimeter springs may in addition be multiple rate perimeter springs. One or more border wires may be disposed around the outer perimeter of the mattress. The mattress may lie in a substantially flat plane in an unloaded state.

In another particular embodiment, at least one of the multiple rate coil springs of the mattress has at least four coils, wherein one to three coils have a different diameter and pitch than the remainder of the coils within that multiple rate coil spring, so that two coils may have a substantially similar diameter and pitch, or three coils may have a substantially similar diameter and pitch, and so forth.

In another embodiment, at least one of the multiple rate coil springs has first and second portions having respective first and second spring rates, wherein the first spring rate is lower than the second spring rate, and wherein the first portion of the coil spring is adapted to compress at least partially by an initial displacement before the second portion compresses. The coils of the first portion may have a smaller pitch and diameter than the coils of the second portion. The first portion is adapted to substantially completely compress before the second portion compresses beyond a minimal displacement or while the second portion remains substantially uncompressed.

In yet another embodiment, the first portion of the multiple rate coil spring is adapted to compress by approximately one to two inches before the second portion compresses beyond a minimal displacement, or while the second portion remains substantially uncompressed.

In still another particular embodiment, the multiple rate coil springs are fabricated from a wire having a substantially uniform diameter, in the range of 0.070 to 0.100 inch, and multiple rate perimeter springs may be fabricated from a wire having a substantially uniform diameter in the range of 0.05 to 0.12 inch. For example, the internal coil springs may have a diameter of approximately 0.09 inch and perimeter springs may have a diameter of approximately 0.11 inch. Other suitable wire sizes may be used.

The mattress may contain two or more multiple firmness zones. For instance, the mattress could have a first plurality of multiple spring rate coil springs, a second plurality of multiple spring rate coil springs, and a third plurality of multiple spring rate coil springs, wherein the multiple spring rates of at least one of the plurality of multiple spring rate coil springs differs from at least one of the other springs.

The first plurality of multiple rate coil springs may further comprise first and second portions having respective first and second spring rates wherein the first spring rate is lower than the second spring rate, and wherein the first portion of the coil spring is adapted to compress at least partially by an initial displacement before the second portion compresses. The coils of the first portion may have a smaller pitch and diameter than the coils of the second portion. Furthermore, the first and third pluralities of multiple rate coil springs may have substantially similar spring rates which differ from the second plurality of multiple rate coil springs.

For example, the first portion of the first and third pluralities of multiple rate coil springs can be adapted to compress by approximately one-half to one inch before the second portion compresses beyond a minimal displacement. Moreover, the first portion of the second plurality of multiple rate coil springs can be adapted to compress by approximately one to two inches before the second portion compresses beyond a minimal displacement.

The first plurality of multiple spring rate coil springs can be disposed in the plurality of pockets to form a head zone at one end of the coil spring assembly. The third plurality of multiple spring rate coil springs can be arranged to form a foot zone at an opposite end of the coil spring assembly. The second plurality of multiple spring rate coil springs can be arranged to form a middle zone disposed between the head and foot zones.

Thus, it is an object of the present invention to provide a method for manufacturing or assembling a coil spring assembly or mattress from coil springs inserted into selected pockets of a pocket strip material, wherein at least one coil spring may have a different spring rate characteristic from one or more other coil springs, and wherein at least one of the coils may have a multiple or varying spring rate.

It is a further object of the invention to provide multiple rate coil springs disposed in a pocket coil matrix.

It is another object of the invention to produce an innerspring unit by inserting springs into predetermined pockets in a single continuous pocket coil strip, wherein at least one of the coils has a spring characteristic which differs from at least one other coil in the strip.

It is yet another object of the invention to have the capability to provide multiple or varying rate coil springs and/or firmness zones, with little or no reliance on using different gauge spring wires or different pocket coil spacing.

It is still another object the invention to provide an automated way to produce such coil spring assemblies or mattresses which is quick, economical, and highly customizable.

It is yet another object to provide a method for assembling a pocket coil inner unit which has customized spring ratios.

It is still another object to provide a method which requires minimal operator intervention, especially regarding determination of the individual location of each multiple rate spring in the assembly matrix.

The above, and other objects, features and advantages will become apparent from the following description and the accompanying drawings.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention, in which:

FIG. 15 is a top view of an automated coil insertion apparatus in cooperation with two coiler apparatuses, which are shown in phantom.

FIG. 16 is a side elevational view of the apparatus of FIG. 15.

FIG. 17 is a partial end view of the apparatus of FIG. 14 as seen from view 17—17.

DETAILED DESCRIPTION OF THE PREFERRED EMBODIMENTS

Figure 2:
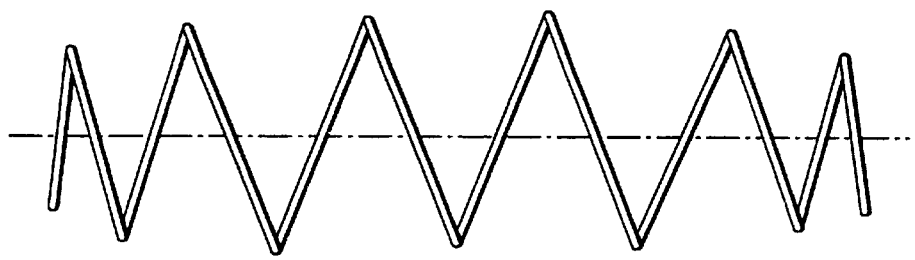
FIG. 2 is a schematic view of a known conventional single rate spring.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

One aspect of the present invention is a coil spring assembly generally comprising a plurality of coil springs, including at least one multiple spring rate coil spring, each multiple spring rate coil spring having at least two spring rates, and a connective matrix means for maintaining the coil springs in a spaced apart relationship. The connective matrix also allows the coil springs to compress and expand within the matrix. Preferably, the coil spring assembly is adapted to allow each said coil spring to compress and expand substantially independently.

In one embodiment, the connective matrix comprises a pocket coil arrangement, where each coil spring is disposed in a respective pocket. The pockets may be preformed with an open or openable end or side, or the pockets may be formed around the springs as the springs are placed in contact with the connective matrix material. Thus, the connective matrix means may comprise a plurality of attached pocket coil strip segments, or the connective matrix means may be of the interwoven type. Each multiple spring rate coil spring consists of a plurality of coils, and each coil of all the springs is preferably fabricated of a wire having substantially uniform thickness.

As used herein, a connective matrix means may include interconnected pockets, or pocket strip material, or segments or sections of pocket strips. The connective matrix means may also comprise an interwoven wire type matrix, such as provided by interconnecting the coil springs with helically shaped wire. Thus, the connective matrix means may include helical coils, or spiral lacing wire, or spiral-shaped connecting elements, or spiral helical coils, or a wire connecting matrix, or a plurality of spiral-shaped connecting elements.

In a particular embodiment, coil springs are disposed within a connective matrix means in a plurality of rows, wherein each said row contains a plurality of coil springs and wherein the spring rate of at least one of the coil springs in at least one of the rows differs from the spring rate of at least one other coil spring in that row. Preferably, the connective matrix means comprises a plurality of attached pocket coil strips, wherein the spring rate of at least one of the coil springs in at least one of the rows of spring filled strip differs from the spring rate of at least one other coil spring in that row.

In another particular embodiment, coil springs are disposed within a connective matrix means in a plurality of rows, wherein each row contains a plurality of coil springs, wherein at least one of the rows contains at least two multiple spring rate coil springs, and wherein the multiple spring rate of at least one of the multiple spring rate coil springs in at least one of the rows differs from the multiple spring rate of at least one other multiple spring rate coil spring in at least one of the rows. The connective matrix means may comprise a plurality of attached pocket coil strip segments, wherein each row is made from at least one coil strip segment.

In yet another particular embodiment includes at least one of the multiple rate springs having at least two coils of different diameters. Another particular embodiment includes at least one of the multiple rate springs having at least two coils of different pitches. Yet another particular embodiment includes at least one of the multiple rate springs with at least two coils having different diameters and pitches.

In another particular embodiment, the present invention comprises a coil spring assembly comprising a plurality of coil springs and a connective matrix means for maintaining the coil springs in a spaced apart relationship and for allowing the coil springs to compress and expand. The coil springs are disposed within the connective matrix means in a plurality of rows, wherein each row contains a plurality of coil springs, and wherein the spring rate of at least one of the coil springs in at least one of the rows differs from the spring rate of at least one other coil spring in that row. The connective matrix means may include a plurality of attached pocket coil strip segments, wherein each row is made from at least one coil strip segment. The coil spring assembly may be adapted to allow each coil spring to compress and expand substantially independently or individually. The plurality of coil springs may further comprise a plurality of perimeter springs generally disposed at the outer perimeter of the coil spring assembly, wherein each of the perimeter springs has a plurality of coils of substantially uniform thickness which is greater than the thickness of the coils of the multiple spring rate coil springs.

A multiple firmness zone may occur wherever at least two adjacent multiple rate springs having substantially similar multiple spring rates are disposed adjacent each other. Thus, two or more springs having substantially similar spring characteristics may be disposed in some adjacent relationship, forming a firmness zone. A zone may be formed by springs which are lengthwise or longitudinally spaced, horizontally or transversely spaced, diagonally spaced, or some combination thereof. A zone may also be formed by placing springs having different spring characteristics in alternating relationship. For example, a spring having a first multiple rate characteristic is placed adjacent a spring having a second multiple rate characteristic, followed by another spring having a first multiple rate characteristic, and so forth. By way of another example, two adjacent springs having a first multiple rate characteristic are placed adjacent two other adjacent springs having a second multiple rate characteristic, followed by another two springs having the first multiple rate characteristic, and so on.

The coil spring assembly may further include a plurality of perimeter springs generally disposed at the outer perimeter of the mattress, for example, a plurality of perimeter springs may be inserted in respective pockets corresponding to the outer perimeter of a mattress having a connective matrix which is provided with a plurality of pockets. Typically, the perimeter springs are stiffer than the internal springs. Thus, each of the perimeter springs may include a plurality of coils of substantially uniform thickness which is greater than the thickness of the coils of the remainder of the multiple rate springs disposed in the internal section of the assembly, i.e. the internal coil springs. Alternatively, the perimeter springs may be constructed of substantially the same wire as the internal coils but wound differently to provide a stiffer spring characteristic.

In another embodiment, the present invention contemplates a coil spring assembly comprising a plurality of coil springs and a connective matrix means for maintaining the coil springs in a spaced apart relationship and for allowing the coil springs to compress and expand, wherein the coil springs are disposed within the connective matrix means in a plurality of rows, wherein each row contains a plurality of coil springs, and wherein the spring rate of at least one of the coil springs in at least one of the rows differs from the spring rate of at least one other coil spring in the row. The connective matrix means may comprises a plurality of attached pocket coil strip segments, wherein each row is made from at least one coil strip segment. The coil spring assembly may be adapted to allow each coil spring to compress and expand substantially independently of each other. The plurality of coil springs may further comprise a plurality of perimeter springs generally disposed at the outer perimeter of the coil spring assembly, wherein each of the perimeter springs has a plurality of coils of substantially uniform thickness which is greater than the thickness of the coils of the multiple spring rate coil springs.

Figure 1:
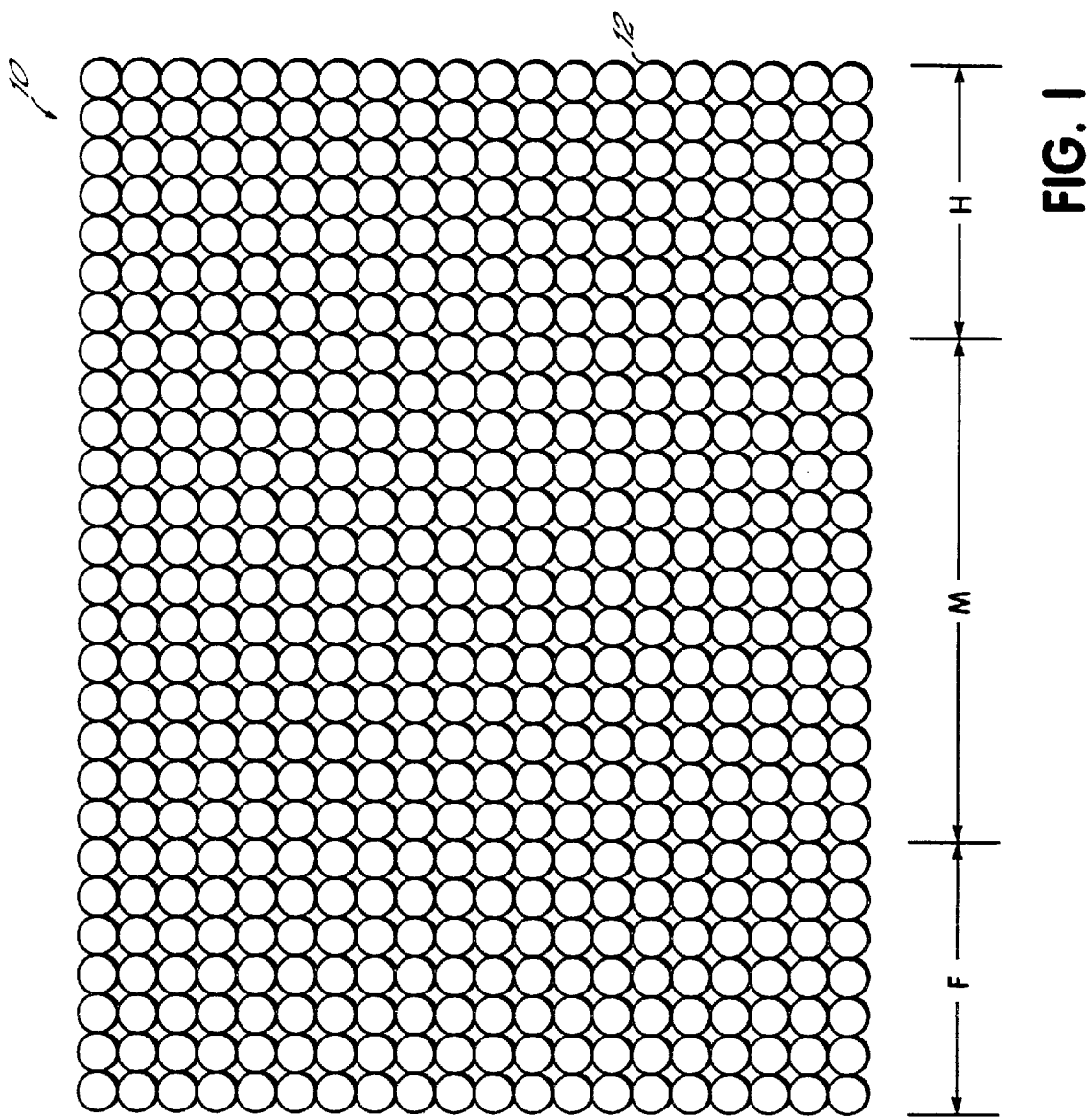
FIG. 1 is a plan view representation of one embodiment comprising a mattress in accordance with the present invention, partially showing the spring filled pockets and showing head, foot and middle zones.

FIG. 1 illustrates a first embodiment of the present invention in the form of a mattress 10. The mattress has a selectable length corresponding to a longitudinal direction, a width corresponding to a transverse direction, and a height corresponding to a vertical direction. Mattresses may be constructed of various shapes and sizes so that, for example, the length could be 78 inches and the width could be 54, 60, 78 or 80 inches, thereby corresponding to dimensions for full, queen or king size mattresses, respectively.

Typically, the mattress lies in a substantially flat plane in an unloaded state. However, the mattress could be constructed to have more than one level, or be disposed in more than one plane, for a particular application. A mattress or cushion may further be formed with one or more concave areas, such as concave regions formed by springs of different heights or by varying the spatial orientation of the connective matrix, or both.

The mattress is preferably formed from a pocket coil matrix having a plurality of pockets for containing a plurality of multiple spring rate coil springs, wherein each spring is disposed in a respective pocket. Each spring has at least two different spring rates, and each spring further preferably comprises a plurality of coils of substantially uniform thickness. Preferably, each of the plurality of springs has a substantially uniform height, although springs of different heights may also be used. Each of the springs is "vertically" oriented in a respective pocket. FIG. 1 shows a matrix representing twenty coils disposed widthwise or transversely, and twenty-seven coils disposed lengthwise or longitudinally, for a total of 540 coil springs which are arranged so that the axis of compression of each spring and the central axis of each pocket are aligned substantially parallel to one another and substantially perpendicular to the weight bearing surfaces which are bordered by the length and width of the mattress.

The spring-filled pockets 12 are shown in FIG. 1 as being substantially uniformly spaced. The spacing shown is similar in both the lengthwise and widthwise directions. However, the pockets and springs may be uniformly spaced in a first direction by a first distance, and further may be substantially uniformly spaced in a second direction, which may be substantially perpendicular to the first direction, by a second distance. The pockets and springs may also be substantially uniformly spaced in only a first direction. Furthermore, nonuniformly spaced pockets and/or springs are also contemplated by the present invention.

The springs may be pre-compressed during insertion into the pockets. After insertion into the pockets and sealing of the pockets is complete, the springs may be rotated or slipped or adjusted into a suitable alignment within the pocket. Preferably, the coil springs reside in the pockets in a preloaded state.

The mattress may have a plurality of perimeter springs disposed in respective perimeter pockets corresponding to the outer perimeter of the mattress. Preferably, each of the perimeter springs includes a plurality of coils of substantially uniform thickness which is greater than the thickness of the coils of the multiple rate springs, as it may be desired to provide the perimeter of the mattress with a stiffer set of springs derived from a thicker gauge wire. Each of the perimeter springs may possess one or more spring rates, as further described below.

The mattress may also include one or more border wires disposed around the outer perimeter of the mattress for further stiffening the perimeter. The border wire may be attached to the mattress after shipping of the mattress occurs to facilitate compression of the mattress during transport.

As the internal coil springs are all preferably fabricated from substantially similar thickness wire, multiple spring rates are achieved by selectively coiling each coil of each coil spring according to one or more predetermined pitches and/or diameters. Preferably, the multiple rate coil springs have both different diameters and different pitches. One example of a multiple rate coil spring may include a first coil having a first diameter and first pitch, and a second coil having a second diameter and second pitch. The coil springs have at least two coils, although many more coils within each spring may also be provided.

The multiple rate coil springs may have at least two coils of different diameters, or at least two coils of different pitches.

In a particular embodiment, at least one of the multiple rate coil springs comprises at least four coils, wherein between one to three coils have a different diameter and pitch than the remainder of the coils within that multiple rate coil spring. In a further particular embodiment, two or three coils may have a substantially similar diameter and pitch, differing from the remainder of the coils within that multiple rate coil spring.

FIG. 2 shows a known conventional coil spring typically used in coil spring assemblies. Such coil springs exhibit an overall singular spring rate to provide a single linear load deflection response and to provide uniform spring characteristics in a coil assembly.

Figures 3, 5, 7:
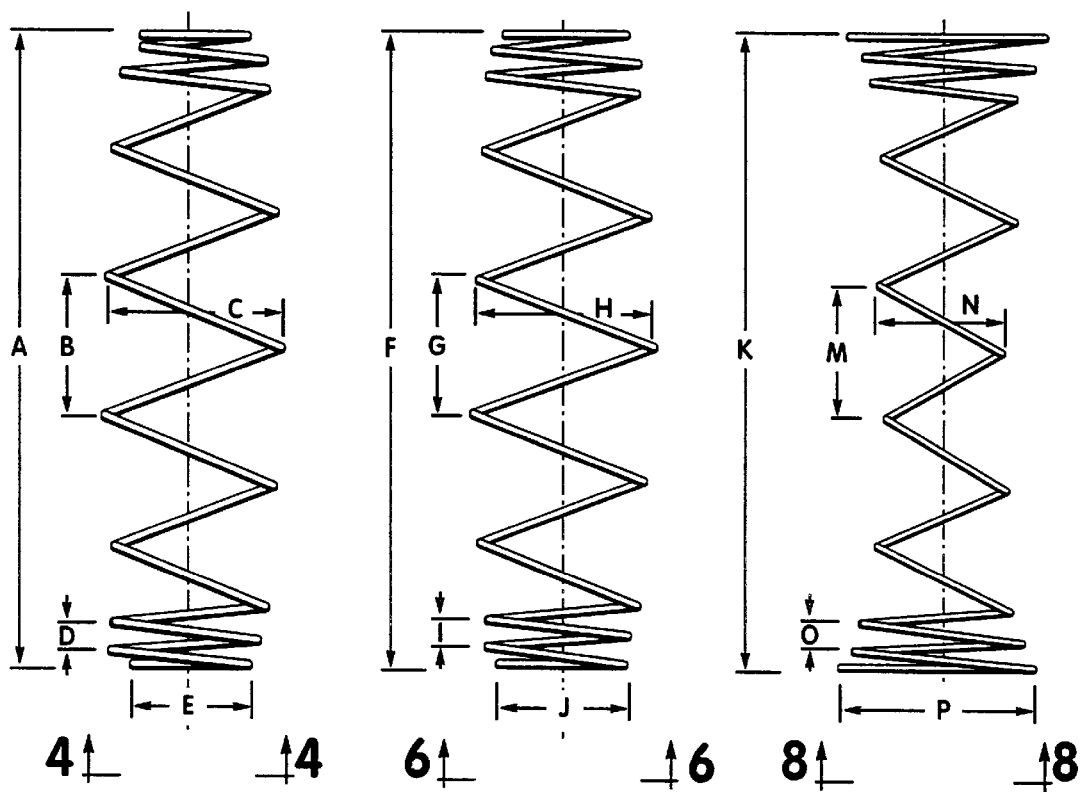
FIG. 3 is a schematic representation of a first preferred embodiment of a coil spring in an unloaded state according to the present invention.
FIG. 5 is a schematic representation of a second preferred embodiment of a coil spring in an unloaded state according to the present invention.
FIG. 7 is a schematic representation of a third embodiment of a coil spring in an unloaded state according to the present invention.
Figure 4:
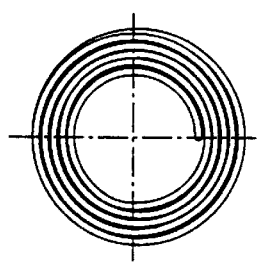
FIG. 4 is a view of the coil spring of FIG. 3 as seen from view 4—4.

FIGS. 3–4 show a first preferred embodiment of a multi-rate coil spring according to the present invention. The pitch on the ends or end portions is smaller than the pitch in middle or middle portion of the spring. The larger pitch provides a greater spring rate, while the smaller pitch provides a lower spring rate. Additionally the diameter of the spring at the ends is smaller than the middle, where the diameter of the spring gradually increases towards the middle. The larger diameter provides a lower spring rate, while the smaller diameters provide a greater spring rate. Preferably, the diameter and pitch are selected to allow the combination of end sections to compress or collapse first, but in a controlled gradual manner, i.e. the diameters and pitches are preferably matched to provide smooth transitions between regions of stiffness in the coil spring. Because of the variable diameter of the spring, the spring collapses inside itself, i.e. the turns of the spring nest within each other, preferably without contact, or with minimal contact, as best seen in FIG. 4, thereby minimizing metal on metal noise. This embodiment of the spring also avoids tangling of one or more coils within a given spring.

Preferably the middle portion of the spring has a sufficiently "small" diameter and/or sufficiently "large" pitch to prevent premature large scale deflection of the middle portion, thereby preventing self-entanglement or distortion of the coil spring.

Furthermore, each end portion of the multi-rate coil spring is provided with an enhanced softness level or softness zone due to its propensity to compress in preference to the middle portion. Thus each coil can provide a localized softness zone which can deflect under a localized load.

The particular embodiment shown in FIG. 3 is provided with a length of 8¾ inches in an unloaded state. The diameter in the middle section is 2½ inches, and the diameter at the ends is 1½ inches. The pitch in the middle in an unloaded state is 1⅞ inches.

Figure 6:
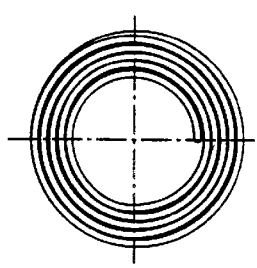
FIG. 6 is the second embodiment of the coil spring of FIG. 5 taken from view 6—6.

FIGS. 5–6 show a second preferred embodiment of a multi-rate coil spring according to the present invention. The length of the second embodiment of the coil spring is 8¼ inches, the diameter in the middle section is 2½ inches, and the diameter at the ends is 1½ inches. The pitch in the middle portion in an unloaded state is 1¾ inches.

Figure 8:
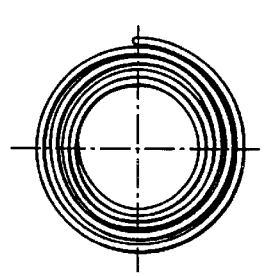
FIG. 8 is the third embodiment of the coil spring of FIG. 7 taken from view 8—8.

FIGS. 7–8 show a third embodiment of a multi-rate coil spring according to the present invention. The overall length, fully expanded, is 8¾ inches, the diameter in the middle section is 1½ inches, and the diameter at the ends 2½ inches. The pitch in the middle portion in the unloaded state is 1⅞ inches. Preferably the smaller pitch and larger diameter at end portions, as well as the larger pitch and smaller diameter of the middle portion, are adapted so that the end portions compress or collapse, preferably fully, before the middle portion begins to compress. As seen in FIG. 8, the coils of the end portions may be adapted to nest within each other, preferably without touching, to minimize noise and/or entanglement created by contact with adjacent coils.

Figure 9:
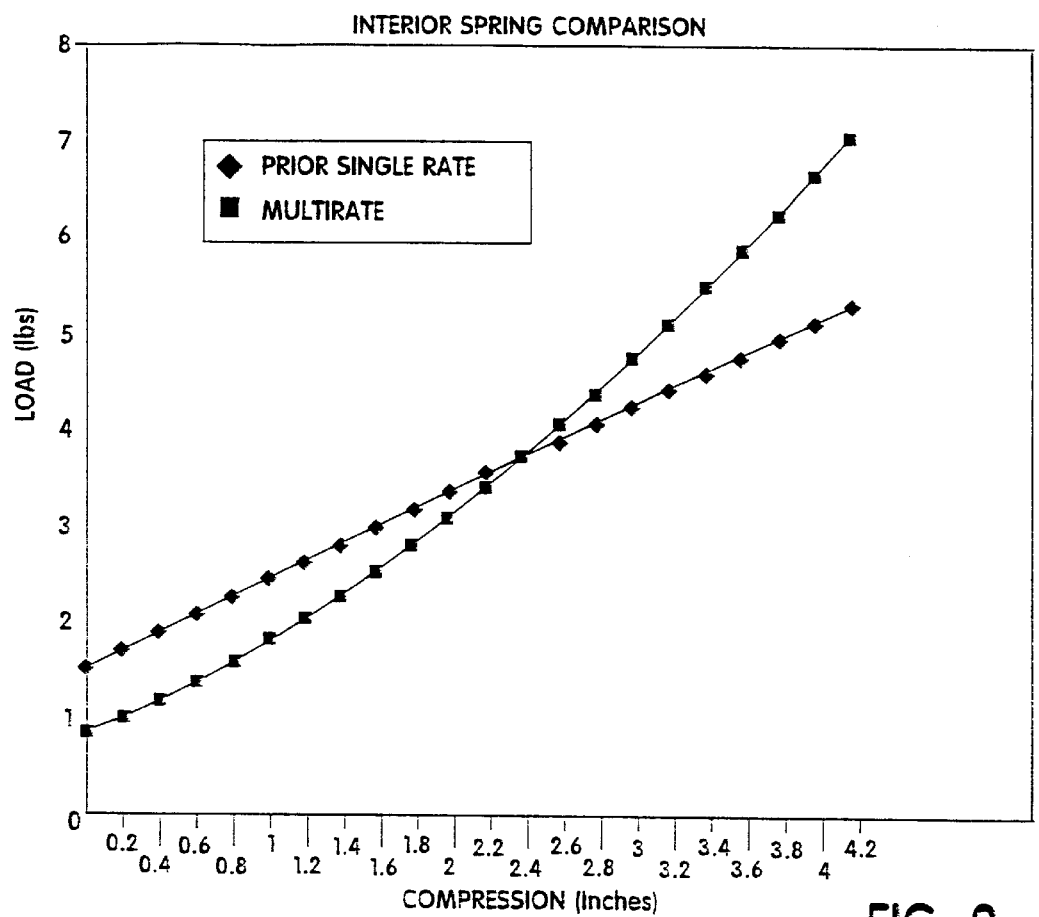
FIG. 9 is a graphical comparison of the load-deflection characteristics of a prior art single rate spring and one embodiment of a multi-rate spring according to the present invention.

FIG. 9 shows a comparison of load-deflection characteristics of a known single rate spring and a multiple spring rate coil spring according to the present invention. It can be seen from FIG. 9 that the particular multi-rate spring tested generally has two distinct firmness levels. In comparison to the known single rate coil spring, the multiple rate coil is initially softer, i.e. requires a lighter load to achieve a given deflection, while the multiple rate spring offers firmness support at deeper deflections.

Other combinations of multiple diameter and/or pitch that yield multiple spring rates within a single coil spring may also be provided.

According to the particular embodiments shown in FIGS. 3–8, the multiple rate coil spring preferably includes two end portions, each end portion having a first spring rate, and a middle portion having a second spring rate, wherein the second spring rate is greater than the first spring rate, so that the end portions of the coil spring are adapted to compress at least partially by an initial displacement before the middle portion compresses.

In another embodiment, a multiple rate coil spring may have a first portion with a first diameter and a second portion with a second diameter. Under increasing amounts of load, the spring may be adapted so that the first portion is partially compressed, while the second portion remains largely uncompressed, or so that the first portion is substantially completely compressed before the second portion compresses beyond a minimal displacement, i.e. the second portion is substantially uncompressed. Under an even greater load, the first portion then becomes substantially completely compressed, and the second portion is first partially, then fully, compressed.

Thus, effective firmness levels within a multiple rate coil spring may be achieved, such that a given load compresses one portion of the spring through a first displacement, that portion having a predetermined spring rate or firmness rating or softness, and an increased or heavier load compresses another portion of the spring through a second displacement, wherein that second portion has another predetermined spring rate or firmness rating. It should be understood that one spring may include more than one portion, and at least one portion has a different spring rate characteristic than the other portion or portions. The spring rate characteristic may be defined by a different diameter or pitch, or both. For example, the coils of the first portion could have a smaller pitch and diameter than the coils of the second portion.

In one particular embodiment, the first portion of the multiple rate coil spring is adapted to compress by a finite deflection such as by approximately one to two inches while the second portion remains substantially uncompressed, or before the second portion compresses beyond a minimal displacement.

In another particular embodiment, the multiple rate coil springs are fabricated from a wire having a substantially uniform diameter of approximately 0.09 inch, and the perimeter springs are multiple rate perimeter springs fabricated from a wire having a substantially uniform diameter of approximately 0.11 inch.

A mattress or a coil spring assembly may be assembled to include two or more firmness zones. For example, the mattress shown in FIG. 1 may have three firmness zones, corresponding to the head "H", foot "F", and middle "M" sections of the mattress, wherein each zone is a multiple firmness zone. In each zone, at least two adjacent multiple rate springs have substantially similar multiple spring rates, thereby forming a multiple firmness zone. The multiple spring rates of one of the zones and at least one other zone preferably differ. For example, the head and foot zones may have similar multiple rate spring characteristics which differ from the middle zone. Other embodiments may include a mixture of multiple rate springs and substantially single rate springs, and may include both multiple firmness zones and single firmness zones.

Thus, the mattress may comprise a first plurality of multiple spring rate coil springs, a second plurality of multiple spring rate coil springs, and a third plurality of multiple spring rate coil springs, wherein the multiple spring rates of at least one of the pluralities of multiple spring rate coil springs differ from at least one of the other plurality of springs.

The first plurality of multiple rate coil springs may further comprise first and second portions having respective first and second spring rates, wherein the first spring rate is lower than the second spring rate, and the first portion of the coil spring is adapted to compress at least partially by an initial displacement before the second portion compresses, or while the second portion remains substantially uncompressed. The coils of the first portion have a smaller pitch and diameter than the coils of the second portion. The first and third pluralities of multiple rate coil springs may be substantially similar. Furthermore, the coils of the first portion may have a smaller pitch and diameter than the coils of the second portion, so that, in a particular embodiment, the first portions of the first and third pluralities of multiple rate coil springs are adapted to compress by a finite deflection, such as by approximately one-half to one inch, before the second portion compresses beyond a minimal displacement, and the first portion of the second plurality of multiple rate coil springs is adapted to compress by a finite deflection, such as by approximately one to two inches, before the second portion compresses beyond a minimal displacement.

In another embodiment, a mattress according to the present invention comprises a first plurality of multiple spring rate coil springs, a second plurality of multiple spring rate coil springs, and a third plurality of multiple spring rate coil springs, wherein the multiple spring rates of at least one of the plurality of multiple spring rate coil springs differs from at least one of the other coil springs.

In yet another embodiment, a mattress according to the present invention comprises a first plurality of multiple spring rate coil springs, each coil spring having a first multiple spring rate, a second plurality of multiple spring rate coil springs, each coil spring having a second multiple spring rate, and a third plurality of multiple spring rate coil springs, each coil spring having a third multiple spring rate, wherein at least one of the multiple spring rates differs from at least one of the other multiple spring rates.

Figure 10:
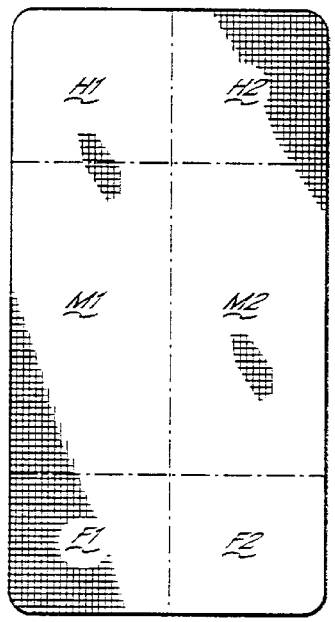
FIG. 10 is a schematic plan view of a mattress according to the present invention showing six zones corresponding to head, foot and middle zones for left and right sides, wherein individual coils or pockets are not shown.

A mattress may have more than three multiple firmness zones, such as the six zones shown in FIG. 10 which correspond to head, middle and foot sections for left and right sides ("H1", "M1", "F1", "H2", "M2", "F2", respectively). Thus, the mattress may be customizable on a zone-by-zone, or on a spring-by-spring basis, to suit the needs of one or more users per mattress.

Figure 11:
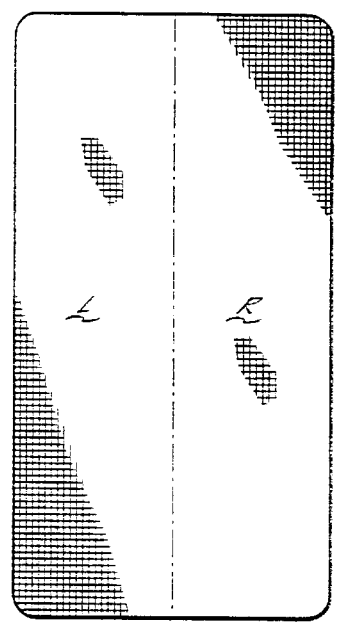
FIG. 11 is a schematic plan view of a mattress according to the present invention showing two zones corresponding to left and right zones without showing individual coils or pockets.

FIG. 11 shows an example of a mattress having two zones, one left side zone "L" and one right side zone "R".

Figure 12:
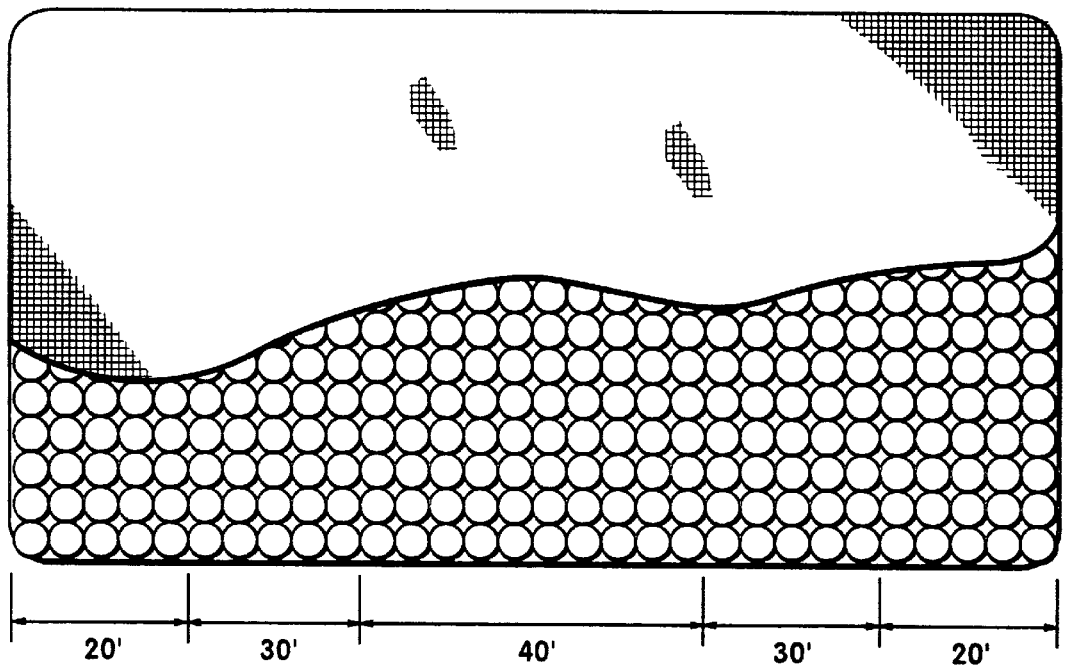
FIG. 12 is a plan view of a mattress component according to the present invention showing five longitudinally spaced zones formed from adjacent longitudinal strips of 30 pocketed springs.
Figure 13:
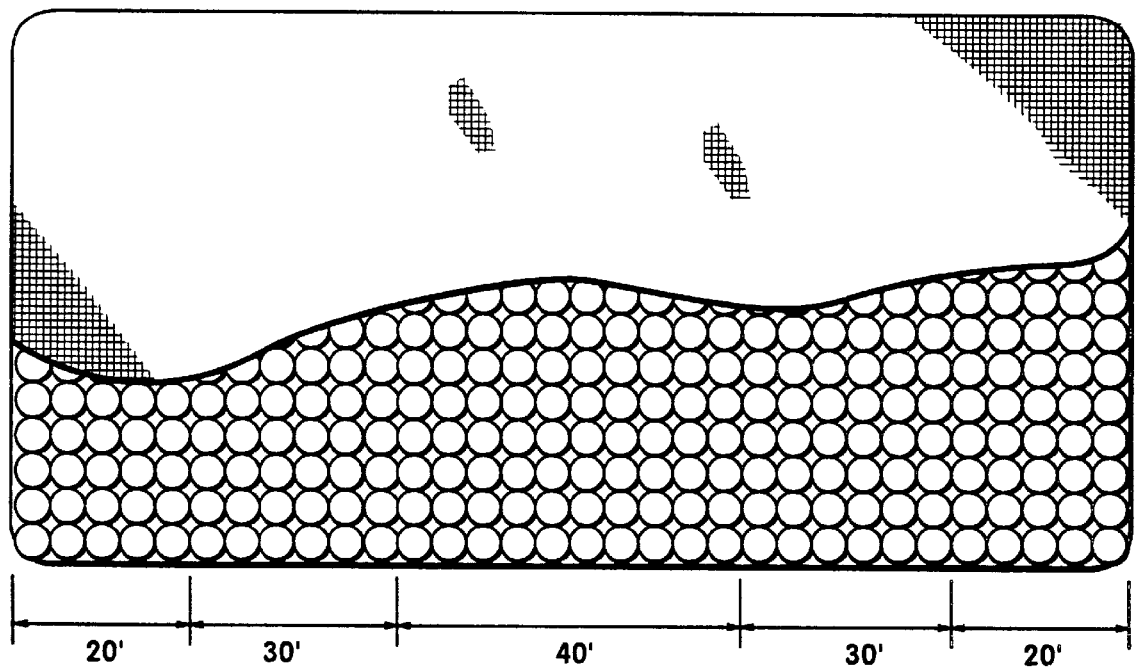
FIG. 13 is a plan view of a mattress component according to the present invention showing five longitudinally spaced zones formed from adjacent longitudinal strips of 32 pocketed springs.

FIGS. 12 and 13 illustrate a particular embodiment of a coil spring mattress assembly or portion thereof having five longitudinally arranged firmness or softness zones.

FIG. 12 shows a symmetric arrangement having two end portions 20', 20', two intermediate portions 30', 30', and a middle portion 40'. The five longitudinally spaced zones are formed from adjacent longitudinal strips of thirty pocketed springs interconnected to form a matrix. The middle portion 40' contains the firmest springs, the end portions 20', 20' contain the second firmest, and the intermediate portions 30', 30', the least firm. For example, if the springs of the middle portion 40' were formed to have a certain load-displacement characteristic or load capacity which is rated at 100%, then the springs of the end 20', 20' and intermediate portions 30', 30' may be formed to exhibit load capacities of approximately 81% and 79%, respectively.

Similarly, FIG. 13 shows a symmetric arrangement having two end portions 20', 20', two intermediate portions 30', 30', and a middle portion 40', wherein the five longitudinally spaced zones are formed from adjacent longitudinal strips of thirty-two pocketed springs.

In another embodiment of the present invention, a coil spring assembly comprises a plurality of tubular pockets, each pocket having a tubular sidewall disposed around a central axis and a pair of endwalls disposed at opposite ends of the tubular sidewall, wherein the pockets are interconnected to form a side-by-side matrix, and a plurality of coil springs, including a plurality of multiple rate coil springs, each coil spring having a plurality of coils, wherein at least one coil spring has a different spring characteristic than at least one other coil spring, wherein each spring has an axis of compression substantially aligned with the central axis of its respective pocket, and wherein the axes of compression and the central axes are substantially perpendicular to the matrix. Preferably, each spring occupies a respective selected pocket. The coil assembly may further comprise at least two zones of coil springs, wherein the coil springs within each respective zone have substantially similar spring rate characteristics, and wherein the spring rate characteristics of at least two of the zones differ. At least one of the coil springs may have at least two spring rates. Furthermore, at least one of the coil springs may comprise a first end portion having a first pitch, a second end portion having the first pitch, and a middle portion having a second pitch and integrally disposed between the first and second end portions. The second pitch may be greater than the first pitch. Moreover, at least one coil of at least one of the end portions of at least one of the coil springs may decrease in diameter in an endward direction.

In another aspect, the present invention comprises, in a particular embodiment, a multiple rate coil spring comprising a plurality of helically wound coils including a first coil, a second coil, and a plurality of intermediate coils disposed therebetween, wherein the pitch of the first coil is smaller than the pitch of the second coil, and wherein the diameter of the first coil is smaller than the diameter of the second coil. The pitch of the intermediate coils may successively increase from the first coil to the second coil. Alternately, or additionally, the diameter of the intermediate coils may successively increase from the first coil to the second coil. Furthermore, the diameter of the intermediate coils may increase from the first coil to the second coil, and wherein the coils are formed to allow the coils, upon compression, to nest within an adjacent coil having a larger diameter. The coils may be are formed to allow adjacent coils to nest within one another without touching. The first coil may be disposed at an end of the coil spring, and the second coil may be disposed in the middle of the coil spring.

In another particular embodiment, the present invention comprises a multiple rate coil spring comprising a first end portion having a first plurality of helically wound coils and a middle portion having a second plurality of helically wound coils, the middle portion being integrally formed with the first end portion, wherein the first plurality of coils includes a first coil and a second coil, wherein the second coil is disposed between the first coil and the middle portion, wherein the first and second coils have substantially similar pitches, wherein the second plurality of coils includes at least one middle coil, wherein the pitch of the middle coil is greater than the pitch of any of the first plurality of coils, and wherein the first end portion and the middle portion are adapted to permit the first end portion to substantially fully compress substantially before the middle portion compresses. The first plurality of coils may be adapted to spirally nest within one another. Furthermore, the first plurality of coils may be adapted to lie substantially in a plane when fully compressed. Moreover, the first plurality of coils may be adapted to spirally nest within one another without having the exterior surfaces of said coils touching one another. Alternately, the first plurality of coils may be adapted to spirally nest on top of one another.

The diameter of the middle coil may be greater than any of the diameters of the first plurality of coils. Furthermore, the diameter of the second coil may be greater than the diameter of the first coil. The diameter of the first coil may be greater than the diameter of the second coil. The diameter of said middle coil may be smaller than the diameters of the first plurality of coils.

The end portion may further include at least part of at least one substantially planar coil.

The multiple rate coil spring may further comprise a second end portion integrally formed with the middle portion, wherein the second portion is symmetric with the first portion about the middle portion. The pitches and the diameters of the middle portion and the end portions are preferably adapted to yield a middle portion which is stiffer than the end portions. The end portions may substantially fully compress substantially before the middle portion compresses.

According to the present invention, a coil spring assembly, or mattress. or cushion is preferably fabricated by an automated method. The manufacture of the coil spring assembly preferably comprises inserting coil springs having predetermined spring rates into respective individual pockets of a continuous pocket strip in a predetermined order. Preferably, the coil springs have predetermined multiple spring rates, and the predetermined multiple spring rates of at least one coil spring in the coil spring assembly may differ from that of the other coil springs. Preferably, each of the coils has at least two different spring rates. The present invention also contemplates inserting coil springs having predetermined single spring rates into respective individual pockets. For example, a multiple spring rate coil spring may be inserted into a first pocket while a single rate spring may be inserted into an adjacent pocket.

The automated method may further include the step of sealing each coil spring inside its respective pocket.

One or more wires, preferably having a substantially uniform thickness, are coiled into springs, preferably having multiple spring rate characteristics, before insertion into the continuous pocket strip.

The spring filled pocket coil strip may be rolled into one or more rolls for storage or shipment. The coil strip may be compressed before, during, or after rolling, to conserve space.

The automated method may further include the steps of cutting the spring-filled strip into one or more desired sections or lengths, placing at least two spring-filled sections adjacent to each other, and attaching adjacent sections together. As with the strip, the attached adjacent sections may be rolled into one or more rolls, and the attached lengths or rolls may be compressed for case of storage or transport. The attached adjacent lengths may also be simultaneously compressed and rolled into one or more rolls.

Wire may be wound to produce a coil having at least two different diameters, or at least two different pitches, or at least two different diameters and at least two different pitches.

The automated method may further include the step of inserting coil springs, preferably including multiple spring rate coil springs, into the pocket strip in a predetermined order to form at least two firmness zones upon attaching adjacent lengths together. The two firmness zones may further comprise a head zone, a foot zone and a middle zone.

The method may further include the step of inserting a plurality of perimeter coil springs in respective perimeter pockets corresponding to the outer perimeter of the coil spring assembly.

Perimeter coil springs may be formed by coiling a wire, preferably having a second substantially uniform thickness, before insertion of the perimeter springs into the continuous pocket strip, wherein the second thickness differs from the thickness of the other coil springs which are disposed in pockets corresponding to the internal or non-perimeter portions of the final assembly. Furthermore, the wire may be coiled into multiple rate perimeter coil springs before insertion into the continuous pocket strip.

The method may further comprise installing one or more border wires around the outer perimeter of the coil spring assembly.

The adjacent strips may be attached by hot melt adhesive, glue or other suitable attachment means.

The springs may be inserted into a coil strip having individual pockets which are uniformly spaced, or the springs may be placed adjacent the pocket strip material wherein the pockets are formed around each spring. The pockets in each length of the coil strip may be uniformly spaced by a first distance, and the adjacent lengths uniformly spaced apart by a second distance.

One method of manufacturing a coil spring assembly is described below. First, input parameters related to the design of the coil spring assembly are input, computed, or otherwise registered. Such input parameters could include, for example: the width and/or length of the final coil assembly; the number, location and/or characteristics of desired firmness zones; the diameter and spacing of the pockets in the pocket strip. Output control signals may be derived or computed from input parameters or feedback signals from other points in the process. At least a first wire, preferably having a substantially uniform thickness, and preferably a second wire, preferably having a second substantially uniform thickness, and a length of continuous pocket strip may be supplied.

Preferably, the pocket strip has a length at least long enough to accommodate all of the coil springs corresponding to an entire final coil spring assembly, although pocket strips having a length corresponding to a portion of the entire final spring assembly may also be used.

Internal coil springs and perimeter coil springs may be coiled from the first and second wires, respectively, according to predetermined multiple rates which are delivered by the control signals that dictate winding. Alternatively, the coil springs or perimeter springs, or both, may be supplied in a pre-formed or pre-coiled state, obviating the need to supply and coil the wire, so that selected springs may be delivered to the strip from one or more hoppers or the like.

Coils are then inserted into the continuous pocket strip. If desired, for example if the coils are not to be immediately cut into lengths, the filled strip may be delineated or marked so as to indicate locations corresponding to the beginning or end of a coil spring assembly, a length, a width, or some other portion thereof. The spring-filled strip may be rolled or stacked, and the strip may be compressed before, during or after rolling or stacking for subsequent storage or transport. Otherwise, the spring-filled strip is cut into sections or lengths, preferably corresponding at least roughly to the desired length or width of the resulting coil spring assembly. The sections or lengths of spring-filled strip may be rolled or stacked, and the lengths may be compressed before, during or after rolling or stacking for subsequent storage or transport. Otherwise the lengths may be attached to one another, for example by hot melt adhesive or glue. The attached sections may be rolled or stacked, and the unbordered assembly may be compressed before, during or after rolling or stacking for subsequent storage or transport. Border wire may be added around the outer periphery or outer perimeter of the coil spring assembly for added stiffness.

Thus, the sections or lengths of spring-filled strip may correspond to a row within the coil spring assembly, wherein the row may be longitudinal, transverse or oriented at an angle with respect to an overall dimension. Furthermore, the sections or lengths may comprise at least part of a coil assembly having a specified overall outline or shape, such as circular, oval, oblong, triangular, hexagonal, square, or other desired configuration.

Figure 14:
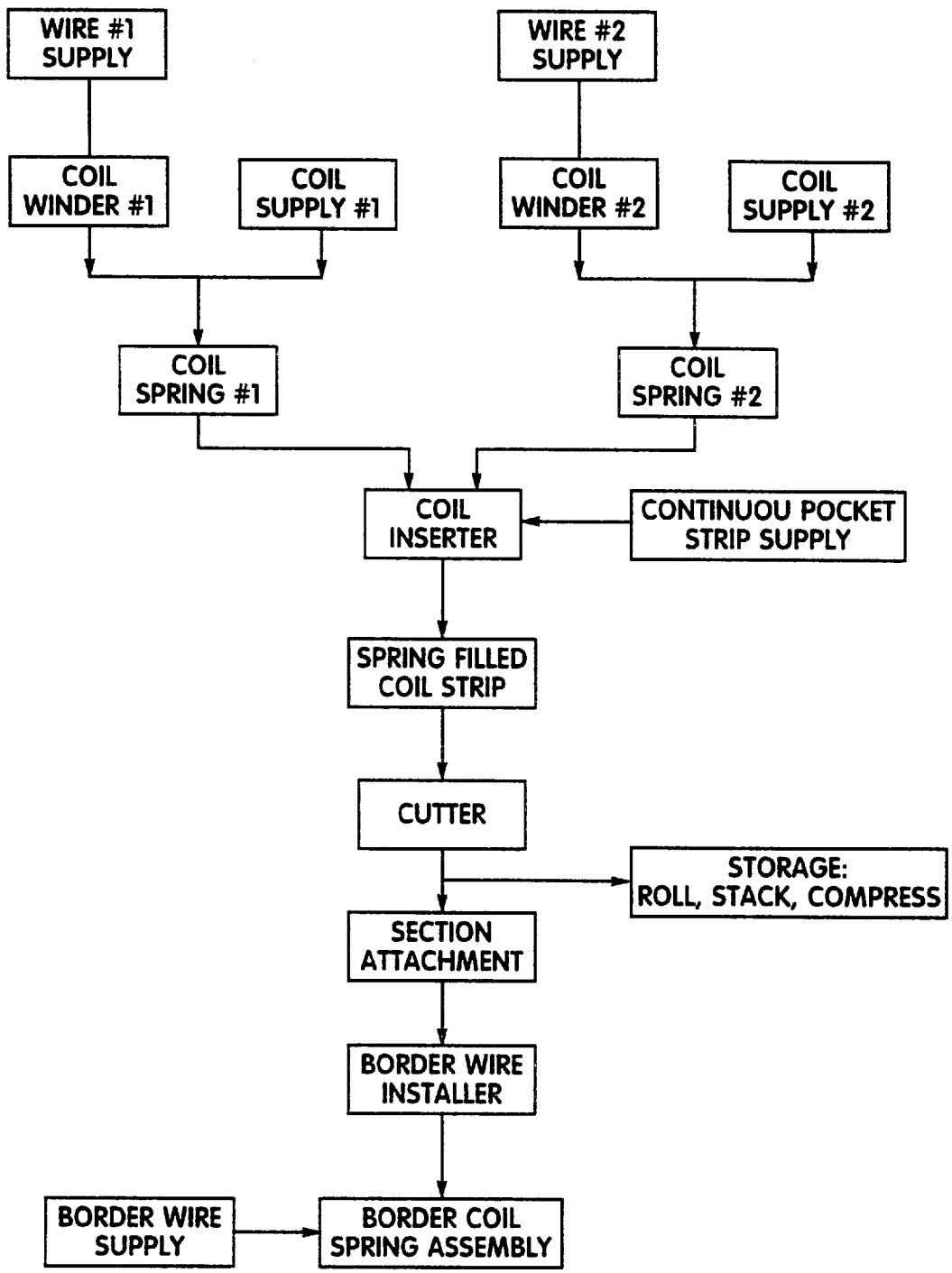
FIG. 14 is a schematic representation of a means of manufacturing a coil spring assembly according to the present invention.

FIG. 14 is a schematic representation of the means by which the coil spring assembly may be manufactured. Input parameters are supplied by the user to a control means or preset into the control means. The control means may receive feedback control signals from various points in the apparatus during the assembly process. The control means computes or derives output control signals and sends the output signals to appropriate points in the process. A first wire having a first diameter, or thickness, or gauge, may be provided by a first wire supply, which may cut the wire into a desired length or supply a continuous feed of wire. The first wire is fed into a first coil winder which winds the wire into a plurality of coils according to the output signals or output parameters from the control means. The coil winder may be adapted to wind the wire into a coil spring having a specified or selectable number of coils, wherein the winder is capable of providing each coil with a diameter and/or pitch different than other coils in the same spring. If the first wire that was fed into the first coil winder was not already cut, the coil spring is then cut, preferably automatically, from the remainder of the first wire, thereby preferably producing a single coil spring having a multiple spring rate characteristic. The coil spring is then fed into a coil inserter.

Similarly, a second wire having a second diameter, or thickness, or gauge, may be provided by a second wire supply, which may cut the wire into desired lengths or which may supply a continuous feed of wire. The second wire is fed into a second coil winder which winds the wire into a plurality of coils according to the output parameters from the control means. The coil winder is capable of winding the wire into a perimeter coil spring having a number of coils, wherein each coil may have a different diameter and/or pitch than other coils in the spring. If the second wire that was fed into the second coil winder was not already cut, the perimeter coil spring is cut, preferably automatically, from the remainder of the second wire, thereby preferably producing a single coil spring which may have a multiple spring rate characteristic. The perimeter coil spring is then fed into the coil inserter.

Optionally, pre-formed or pre-coiled springs having either the first or second thickness, or springs having a different thickness wire, may be supplied to the coil inserter.

A length of continuous pocket strip or pocket strip material is also fed into the coil inserter.

The coil inserter then inserts the internal coil springs or perimeter coil springs into the pocket strip according to the predetermined order communicated from the control means in response to user input or according to a preset pattern.

The spring-filled coil strip may then either be rolled, stacked, or compressed, or fed into the pocket coiler mattress assembly machine. The assembly machine cuts lengths of the spring-filled pocket strip according to the output control signals. A cut length may then either be rolled, stacked, or compressed, or attached to other cut lengths, for example by gluing or hot melt adhesive, into an unbordered spring-filled pocket coil assembly. Border wire may be added to the outside perimeter of the coil assembly for added stiffness.

Input parameters could include overall length and row width of the final coil assembly matrix and the number, characteristics, and location of individual springs or firmness zones.

Output control signals could include, for example, the number of pockets or coil springs per row or per cut length, the location of each pocket within the matrix, and the particular spring rate characteristics of a coil spring or perimeter spring corresponding to a particular pocket or location.

Coil spring characteristics may also be characterized or computed according to other parameters, such as the number of spring rate portions per coil per zone based on desired load weight and displacement characteristics, diameter and pitch per spring rate portion, spring wire gauge or thickness, and/or height.

Thus, the means for manufacturing the coil spring assembly may include the following: means for inputting desired coil spring assembly characteristics; means for inputting desired coil characteristics or patterns; means for selecting a coil spring coiling pattern; means for cutting a wire into a desired length; means for coiling a length of wire into a coil spring having the selected coil spring coiling pattern or characteristics; means for cutting the coil spring to a desired height; means for inserting a coil spring into a pocket or area corresponding to its preselected matrix location, preferably in a pre-compressed or pre-loaded state; and means for securing the coil spring in its respective pocket. The means for manufacturing the coil spring assembly may also include means for winding the spring filled strip or matrix for storage. The means for manufacturing the coil spring assembly may further include means for reorienting, or flipping, or impacting a coil spring in its respective pocket. Furthermore, the means for manufacturing the coil spring assembly may include means for cutting a specified length of the spring filled continuous pocket strip into one or more sections; and means for assembling lengths of spring filled strips or strip segments together, such as means for placing the sections into adjacent relationship corresponding to a desired overall matrix location and means for fixedly attaching the adjacent sections together to form the desired spring filled matrix. The manufacture may further be accomplished with means for inserting perimeter springs into the continuous pocket strip in locations corresponding to the outer perimeter of the coil spring assembly prior to cutting into sections, and means for inserting border wire around the periphery of the coil spring assembly.

By way of example, various coil springs may be placed in a continuous pocket coil strip used to form a mattress which has twenty pockets disposed along an edge, wherein adjacent sections of spring filled product strip are attached to one another in a side by side relationship parallel to the edge. The beginning of the continuous pocket strip, wherein the first twenty pockets correspond to the first row, are filled with perimeter springs. The first row could correspond to the first row of coils located at the head or foot or side of a mattress. The twenty-first and forty-first pockets contain perimeter springs, while the intervening twenty-second through fortieth pockets contain internal coil springs, wherein the twenty-first through forty-first pockets correspond to the second column of the coil spring assembly. Similarly, a perimeter spring is disposed in the forty-second pocket, followed by internal coil springs, and so on.

Thus, production of a coil spring assembly having a plurality of multiple spring rate coil springs, wherein the spring characteristics of each spring coil may differ from other coil springs, may be accomplished in an automated fashion on a continuous basis. Production may also be performed on a batch basis, where a part of a mattress, a single mattress, or a number of mattresses are fabricated in a single run, as may be used when constructing highly customized mattresses, or when it is desired to change one or more wire thicknesses from mattress to mattress.

Different gauge wire may be used in a single mattress. For example, head, foot, and middle sections may each contain springs of different diameters. Furthermore, different gauge wires may be fed sequentially into a single coiler. However, it is usually preferable to have one coiler for each different wire gauge in order to speed the process of manufacture. If only one coiler is available, it may be preferable to coil one set of springs in advance and feed those coil springs from a hopper.

It should be noted that every spring in a final coil spring assembly may comprise springs wherein each has a different multiple spring rate characteristic from any other spring in the assembly, and wherein each spring is selectively placed in a particular matrix location in relation to the other springs in the assembly.

Furthermore, all the springs may have the same multiple spring rate characteristics.

Moreover, a final coil spring assembly may include perimeter springs or border wire. On the other hand, perimeter or border springs may be omitted altogether.

A coil spring assembly, or a portion thereof, may thus form a single horizontal layer, or may be stacked and interconnected to form a multiple horizontal layer assembly. The coil spring assembly may be substantially planar, or may be formed or adapted to a variety of shapes and configurations. For example, the spring assembly may have concave or convex surfaces, or may have a square, circular, rectangular, triangular shape. Other shapes and configurations. whether two- or three-dimensional, may be constructed according to the present invention.

FIGS. 15–17 illustrate a first coiler apparatus 100, a second coiler apparatus 102, and a coil insertion apparatus 104. One or both coiler apparatuses 100, 102 may be replaced by a coil hopper if appropriate coils are made in advance. A first conveyor 106*a* transports coils from the first coiler 100 toward the insertion apparatus 104. Similarly, coils from the second coiler apparatus 102 are transported toward the insertion apparatus 104 by a second conveyor 106*b*. The coils are preferably aligned transversely with respect to the direction of travel of first and second conveyors 106*a–b*, whereupon the coils are placed or fall by gravity into the hopper 108. The hopper 108 preferably has a wedge shape so that the coil falls by gravity into the bottom of the wedge. The hopper or chute 108 facilitates the delivery of each coil in a longitudinal alignment with the line of travel of the insertion apparatus 104.

The insertion apparatus 104 further comprises a compression plunger 110, a rotatable turret 112 having at least one outer portion 114 having a recess 116 adapted to receive and retain a compressed coil, a means 118 for rotating the turret 112 to place a respective recess 116 into alignment with coil strip material 120 which is fed into the insertion apparatus 104, and a means 122 for inserting the compressed spring into contact with the coil strip material 120. FIG. 15 shows four outer portions 114 equally separated by 90°. Each outer portion 114 defines a radial opening through which a coil may be inserted into the turret 112, a first transverse opening through which the distal end of a coil insertion plunger 124 contacts the compressed coil spring, and a second transverse opening opposite the first opening, from which the coil may be ejected. The outer portion 114 further includes a means 126 for temporarily retaining the coil within the cavity in a compressed state, and in particular prevents the coil spring from radially exiting the turret 112. The coil may be retained by a hinged mechanism, such as a one-way cam locking device.

As best seen in FIG. 15, the coil strip material 120 may be supplied from a roll 128 of coil strip material 120 which may be unrolled as it is fed into the insertion apparatus 104. In the particular embodiment shown in FIGS. 15–17, a sheet of coil strip material is drawn from the roll 128 and folded in half by a folding means 130, whereby the open end faces inwardly towards the insertion apparatus 104 and the folded crease is disposed outwardly. The folded coil strip material 120 is then advanced adjacent the insertion apparatus 104 in order to be filled with coil springs.

The insertion apparatus 104 further comprises a spreading wedge 132 which spreads the top and bottom layers of coil strip material 120 in advance of the coil insertion area of the insertion apparatus 104 as the material travels alongside. The insertion apparatus 104 also includes a top plate and a bottom plate disposed above the top layer and below the bottom layer of strip material. respectively. After the turret 112, which contains a compressed spring in one of its recesses 116, is rotated into position so the spring is aligned with the coil insertion plunger 124. The coil insertion plunger 124 is then actuated toward the turret 112 and the coil spring retention means 126 is released, thereby displacing the coiled spring from the recess of the outer portion 114 of the turret 112. The compressed coil spring is further advanced by the coil insertion plunger 124 between two intermediate telescoping plates which are disposed between the turret 112 and the top and bottom plates. The intermediate plates extend partially between the two top and bottom plates, wherein the top layer of folded coil strip material passes between a gap between the top outer plate and the top intermediate plate, and the bottom layer of the folded coil strip material passes through the gap between the bottom intermediate plate and the bottom outer plate.

At the fullest extent of the coil insertion plunger 124, the spring is displaced beyond the intermediate plates to rest between the top and bottom layers of folded strip material 120. The spring is substantially prevented from expanding within the coil strip material 120 by the top and bottom outer plates. As best seen in FIG. 16, the insertion apparatus 104 further comprises a plurality of guiding plates 150 which maintain the coil filled strip material in a compressed state as the spring-filled material is longitudinally advanced through the insertion apparatus 104.

The apparatus 104 further includes a sealing means for enclosing the coil spring within pockets of coil strip material. First and second sewing mechanisms 154, 156 are best seen in FIG. 16, wherein the first sewing mechanism 154 traverses and sews or seals the coil filled strip material transversely in a back and forth fashion, while the second sewing mechanism 156 applies a longitudinal seal or seam to the material. Preferably, the system is adapted so that the second sewing mechanism 156 seals only one longitudinal edge of the material, as the other longitudinal edge has a folded crease. Thus, the coil spring is entrapped inside its respective pocket in a compressed state with its axis of compression lying generally perpendicular to the central axis of the pocket. With respect to the apparatus shown in FIGS. 15–16, the pockets are formed transverse to the direction of strip material fed through the apparatus, where the strip material exits the apparatus in a generally horizontal orientation, and the axis of compression of each inserted coil spring is generally vertical. The coil filled strip material may at this juncture be rolled, or stacked, while preferably maintaining the compressed coil spring in such a perpendicular orientation, if desired. The coil filled strip may instead be fed or inserted into a device which reorients or flips each coil spring within its respective pocket. Thus, the insertion apparatus 104 may further comprise an impact mechanism for imparting a transverse force to the compressed coil within its pocket of the coil strip. The impact mechanism is adapted to impact the spring in an appropriate direction and with sufficient force to cause the spring to reorient itself within its pocket, e.g. by 90°, whereupon the spring at least partially expands to fill the pocket in a proper orientation. Preferably, the spring finally situates itself within the pocket in a preloaded or partially compressed state. Thus, the reoriented spring may have a lesser degree of compression than its initially inserted state.

Thus, the insertion apparatus 104 is adapted to insert springs coiled by various types of coilers. The first and second coiler apparatus, 100 and 102, may be any suitable known spring coiling devices capable of producing the desired springs.

The coil filled strip material may be cut into sections or lengths. The sections or lengths may be attached to one another, for example by hot melt adhesive or glue in a manner which allows each spring to compress and expand generally independently or individually. Preferably the pockets of adjacent sections are attached by application of adhesive or melt near the middle of the pocket while leaving the ends of the pocket of adjacent sections unattached.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An automated method for the manufacture of a coil spring assembly comprising inserting coil springs into respective individual pockets of a continuous pocket strip in a predetermined order wherein at least one of said coil springs has predetermined multiple spring rates.

2. The automated method according to claim 1 further comprising at least two predetermined multiple spring rate coil springs, wherein said predetermined multiple spring rates of at least one of said predetermined multiple spring rate coil springs differs from that of the other predetermined multiple spring rate coil springs.

3. The automated method according to claim 1 further comprising sealing each said coil spring inside its respective pocket.

4. The automated method according to claim 1 further comprising coiling one or more wires having a substantially uniform thickness into said multiple rate coil springs before insertion into said continuous pocket strip.

5. The automated method according to claim 1 wherein said continuous spring-filled strip is cut into sections, wherein said predetermined multiple spring rates of at least one of said predetermined multiple spring rate coil springs in a first cut spring-filled strip differs from that of the other coil springs in said first strip.

6. The automated method according to claim 1 further comprising:
    cutting the spring-filled strip into one or more desired lengths;
    placing at least two spring-filled lengths adjacent to each other; and
    attaching adjacent lengths together.

7. The automated method according to claim 6 further comprising inserting said coil springs into said pocket strip in a predetermined order to form at least two firmness zones upon attaching said adjacent lengths together.

8. The automated method according to claim 6 further comprising installing one or more border wires around the outer perimeter of said coil spring assembly.

9. The automated method according to claim 1 further comprising inserting a plurality of perimeter coil springs in respective perimeter pockets corresponding to the outer perimeter of said coil spring assembly.

10. The automated method according to claim 9 where said perimeter coil springs are formed by coiling a wire having a second substantially uniform thickness before insertion into said continuous pocket strip, wherein said second thickness differs from the thickness of at least one other said coil spring.

11. An automated method of manufacturing a coil spring assembly from a continuous pocket coil strip having a plurality of open pockets disposed along a longitudinal axis, wherein each said pocket has a central axis which is substantially orthogonal to said longitudinal axis of said coil strip, and from a plurality of coil springs, each said coil spring having a plurality of coils, and wherein at least one coil spring has a predetermined multiple spring rate and has a different spring rate characteristic than at least one other coil spring and wherein each spring has an axis of compression, the method comprising:
    inserting each said spring into a respective open pocket of said continuous pocket coil in a predetermined order; and
    closing said pockets.

12. The automated method according to claim 11 further comprising detaching, at respective predetermined lengths, at least two sections of said continuous pocket coil strip containing said springs.

13. The automated method according to claim 12 further comprising attaching said at least two sections in side-by-side relationship, wherein the longitudinal axes of said sections are substantially parallel to each other and the axes of compression of said coil springs are parallel to each other.

14. The method according to claim 13 wherein said attached portions of pocket coil form a pocket coil assembly having at least two zones of coil springs wherein said coil springs of each said zone have substantially similar spring rate characteristics, and wherein the spring rate characteristics of at least two of said zones differ.

15. The automated method according to claim 11 further comprising aligning the axis of compression of each said spring perpendicular to the central axis of a respective said pocket before insertion.

16. The automated method according to claim 15 further comprising rotating each said spring within its respective said pocket thereby aligning the axis of compression of each said spring with the axis of its respective said pocket.

17. The method according to claim 11 wherein said one other coil spring has at least two spring rates.

18. The method according to claim 11 wherein said at least one of said coil springs comprises:
    a first end portion having a first pitch;
    a second end portion having the first pitch; and
    a middle portion having a second pitch and integrally disposed between said first and second end portions.

19. The method according to claim 18 wherein said second pitch is greater than said first pitch.

20. The method according to claim 18 wherein at least one coil of at least one of said end portions of at least one of said coil springs decreases in diameter in an endward direction.

21. A coil spring assembly comprising:
    a plurality of coil springs, including at least one multiple spring rate coil spring, each said multiple spring rate coil spring having at least two spring rates;
    a connective matrix means for maintaining said coil springs in a spaced apart relationship and for allowing said coil springs to compress and expand; and
    wherein said connective matrix means comprises a plurality of attached pocket coil strip segments.

22. The coil spring assembly according to claim 21 wherein said coil spring assembly is adapted to allow each said coil spring to compress and expand substantially independently.

23. The coil spring assembly of claim 21 wherein said at least one multiple spring rate coil spring comprises:
    a plurality of helically wound coils including a first coil, a second coil, and a plurality of intermediate coils disposed therebetween, wherein the pitch of said first coil is smaller than the pitch of said second coil, and wherein the diameter of said first coil is smaller than the diameter of said second coil.

24. The coil spring assembly according to claim 23 wherein the pitch of said intermediate coils successively increases from said first coil to said second coil.

25. The coil spring assembly according to claim 23 wherein the diameter of said intermediate coils successively increases from said first coil to said second coil.

26. The coil spring assembly according to claim 23 wherein the diameter of said intermediate coils increases from said first coil to said second coil, and wherein said coils are formed to allow said coils, upon compression, to nest within an adjacent coil having a larger diameter.

27. The coil spring assembly according to claim 23 wherein said coils are formed to allow adjacent said coils to nest within one another without touching.

28. A coil spring assembly comprising:

a plurality of coil springs, including at least one multiple spring rate coil spring, each said multiple spring rate coil spring having at least two spring rates;

a connective matrix means for maintaining said coil springs in a spaced apart relationship and for allowing said coil springs to compress and expand; and wherein said coil springs are disposed within said connective matrix means in a plurality of rows, wherein each said row contains a plurality of said coil springs, and wherein the spring rate of at least one of said coil springs in at least one of said rows differs from the spring rate of at least one other coil spring in said row.

29. The coil spring assembly of claim 28 wherein said at least one multiple spring rate coil spring comprises:

a first end portion having a first plurality of helically wound coils; and a middle portion having a second plurality of helically wound coils, said middle portion being integrally formed with said first end portion;

wherein said first plurality of coils includes a first coil and a second coil;

wherein said second coil is disposed between said first coil and said middle portion;

wherein said first and second coils having substantially similar pitches;

wherein said second plurality of coils includes at least one middle coil;

wherein the pitch of said middle coil is greater than the pitch of any of said first plurality of coils; and wherein said first end portion and said middle portion are adapted to permit said first end portion to substantially fully compress substantially before said middle portion compresses.

30. The coil spring according to claim 29 wherein said first plurality of coils is adapted to spirally nest within one another.

31. The coil spring according to claim 30 wherein said first plurality of coils is adapted to lie substantially in a plane when fully compressed.

32. The coil spring according to claim 30 wherein said first plurality of coils is adapted to spirally nest within one another without having the exterior surfaces of said coils touching one another.

33. A coil spring assembly comprising:

a plurality of coil springs, including at least one multiple spring rate coil spring, each said multiple spring rate coil spring having at least two spring rates;

a connective matrix means for maintaining said coil springs in a spaced apart relationship and for allowing said coil springs to compress and expand; and wherein said coil springs are disposed within said connective matrix means in a plurality of rows, wherein each said row contains a plurality of said coil springs, wherein at least one of said rows contains at least two multiple spring rate coil springs, and wherein the multiple spring rate of at least one of said multiple spring rate coil springs in said at least one of said rows differs from the multiple spring rate of at least one other multiple spring rate coil spring in said at least one of said rows.

34. A coil spring assembly comprising:

a plurality of coil springs; and a connective matrix means for maintaining said coil springs in a spaced apart relationship and for allowing said coil springs to compress and expand;

wherein said coil springs are disposed within said connective matrix means in a plurality of rows, wherein each said row contains a plurality of said coil springs, and wherein the spring rate of at least one of said coil springs in at least one of said rows has predetermined multiple spring rates and differs from the spring rate of at least one other coil spring in said row.

35. The coil spring assembly according to claim 34 wherein said coil spring assembly is adapted to allow each said coil spring to compress and expand substantially independently.

36. The coil spring assembly according to claim 34 wherein said plurality of coil springs further comprises a plurality of perimeter springs generally disposed at the outer perimeter of said coil spring assembly, wherein each of said perimeter springs has a plurality of coils of substantially uniform thickness which is greater than the thickness of said coils of said multiple spring rate coil springs.

37. A mattress of pocket coil construction comprising:

a plurality of pockets; and a plurality of coil springs, including at least one multiple spring rate coil spring, each said multiple spring rate coil spring having at least two spring rates;

wherein each said spring further comprises a plurality of coils; and wherein said springs are disposed in respective said pockets.

38. The mattress according to claim 37 wherein at least two adjacent said multiple rate springs have substantially similar multiple spring rates, thereby forming at least one multiple firmness zone.

39. The mattress according to claim 37 wherein at least one of said multiple rate coil springs further comprises first and second portions having respective first and second spring rates, respectively;

wherein said first spring rate is lower than said second spring rate; and wherein said first portion of said coil spring is adapted to compress at least partially by an initial displacement before said second portion compresses.

40. The mattress according to claim 37 further comprising:

a first plurality of multiple spring rate coil springs;

a second plurality of multiple spring rate coil springs; and a third plurality of multiple spring rate coil springs;

wherein the multiple spring rates of at least one of said plurality of multiple spring rate coil springs differs from at least one of the other said coil springs.

41. The mattress according to claim 37 further comprising:

a first plurality of multiple spring rate coil springs, each said coil spring having a first multiple spring rate;

a second plurality of multiple spring rate coil springs, each said coil spring having a second multiple spring rate; and a third plurality of multiple spring rate coil springs, each said coil spring having a third multiple spring rate;

wherein at least one of said multiple spring rates differs from at least one of the other said multiple spring rates.

42. A coil spring assembly comprising:

a plurality of tubular pockets, each said pocket having a tubular sidewall disposed around a central axis and a pair of endwalls disposed at opposite ends of said tubular sidewall, wherein said pockets are interconnected to form a side-by-side matrix; and a plurality of coil springs, including a plurality of multiple rate coil springs, each said coil spring having a plurality of coils, wherein at least one coil spring has a different spring characteristic than at least one other coil spring, wherein each spring has an axis of compression substantially aligned with the central axis of its respective pocket, and wherein the axes of compression and the central axes are substantially perpendicular to said matrix.

43. The coil assembly according to claim 42 wherein each said spring occupies a respective selected pocket.

44. The coil assembly according to claim 42 further comprising at least two zones of coil springs, wherein said coil springs within each respective said zone have substantially similar spring rate characteristics, and wherein the spring rate characteristics of at least two of said zones differ.

45. The coil assembly according to claim 42 wherein at least one of said coil springs has at least two spring rates.

46. The coil assembly according to claim 42 wherein at least one of said coil springs comprises:

a first end portion having a first pitch;

a second end portion having said first pitch; and a middle portion having a second pitch and integrally disposed between said first and second end portions.

47. The coil assembly according to claim 46 wherein said second pitch is greater than said first pitch.

48. The coil assembly according to claim 46 wherein at least one coil of at least one of said end portions of at least one of said coil springs decreases in diameter in an endward direction.

* * * * *